US010769250B1

(12) United States Patent
Tautschnig et al.

(10) Patent No.: US 10,769,250 B1
(45) Date of Patent: Sep. 8, 2020

(54) TARGETED SECURITY MONITORING USING SEMANTIC BEHAVIORAL CHANGE ANALYSIS

(71) Applicant: Amazon Technologies, Inc., Seattle, WA (US)

(72) Inventors: Michael Tautschnig, London (GB); John Cook, Brooklyn, NY (US)

(73) Assignee: Amazon Technologies, Inc., Seattle, WA (US)

( * ) Notice: Subject to any disclaimer, the term of this patent is extended or adjusted under 35 U.S.C. 154(b) by 81 days.

(21) Appl. No.: 15/794,757

(22) Filed: Oct. 26, 2017

(51) Int. Cl.
    *G06F 21/00*      (2013.01)
    *G06F 21/12*      (2013.01)
    *G06F 8/41*      (2018.01)
    *G06F 11/34*      (2006.01)
    *G06F 8/71*      (2018.01)
    *G06F 8/75*      (2018.01)

(52) U.S. Cl.
CPC ............... *G06F 21/12* (2013.01); *G06F 8/42* (2013.01); *G06F 8/436* (2013.01); *G06F 8/71* (2013.01); *G06F 8/75* (2013.01); *G06F 11/3466* (2013.01)

(58) Field of Classification Search
CPC . G06F 21/12; G06F 8/42; G06F 8/436; G06F 8/71; G06F 8/75; G06F 11/3466
See application file for complete search history.

(56) References Cited

U.S. PATENT DOCUMENTS

| | | | |
|---|---|---|---|
| 6,567,786 B1 * | 5/2003 | Bibelnieks | G06Q 30/02 |
| | | | 705/14.44 |
| 9,311,056 B2 * | 4/2016 | Armstrong | G06F 8/30 |
| 9,563,768 B2 * | 2/2017 | Li | H04L 63/083 |
| 9,921,948 B2 * | 3/2018 | Zieder | G06F 8/60 |
| 10,248,549 B1 * | 4/2019 | Davies | G06F 11/3676 |
| 10,261,870 B2 * | 4/2019 | Cmielowski | G06F 11/1479 |
| 10,452,366 B2 * | 10/2019 | Daniel | G06F 8/36 |

(Continued)

OTHER PUBLICATIONS

Mithun Acharya and Brian Robinson "Practical change impact analysis based on static program slicing for industrial software systems." In Proceedings of the 33rd International Conference on Software Engineering (ICSE '11). ACM, New York, NY, USA, 746-755'; (2011). (Year: 2011).*

(Continued)

*Primary Examiner* — Don G Zhao
(74) *Attorney, Agent, or Firm* — Nicholson De Vos Webster & Elliott LLP

(57) ABSTRACT

Techniques for targeted security monitoring using semantic behavioral change analysis are described. A mutation monitor can use a code repository to generate a build of a software project prior to a code commit and another build after the code commit. An instruction-difference between the builds can be generated and used to perform a change impact analysis to identify control-flow and data dependencies changed as a result of the code commit. A semantic difference can be generated by annotating a syntactic difference for the code commit based on the identified control-flow and data dependency changes to allow for the behavioral changes to be easily shown to a user. Security impact analysis can be performed on parts of the software impacted by the code commit to quickly determine the security impacts introduced by the code commit.

18 Claims, 12 Drawing Sheets

(56) References Cited

U.S. PATENT DOCUMENTS

| | | | | |
|---|---|---|---|---|
| 2004/0015642 | A1* | 1/2004 | Moir | G06F 9/524 |
| | | | | 711/1 |
| 2006/0059253 | A1* | 3/2006 | Goodman | G06Q 10/10 |
| | | | | 709/223 |
| 2006/0173885 | A1* | 8/2006 | Moir | G06F 9/466 |
| 2007/0288899 | A1* | 12/2007 | Fanning | G06F 11/3616 |
| | | | | 717/124 |
| 2008/0120129 | A1* | 5/2008 | Seubert | G06Q 10/06 |
| | | | | 705/35 |
| 2012/0036492 | A1* | 2/2012 | Armstrong | G06F 8/71 |
| | | | | 717/100 |
| 2014/0096113 | A1* | 4/2014 | Kuehlmann | G06F 11/3672 |
| | | | | 717/126 |
| 2014/0149969 | A1* | 5/2014 | Brower | G06F 8/423 |
| | | | | 717/140 |
| 2014/0281713 | A1* | 9/2014 | Hampapur | G06F 11/079 |
| | | | | 714/26 |
| 2015/0100940 | A1* | 4/2015 | Mockus | G06F 8/70 |
| | | | | 717/101 |
| 2015/0143335 | A1* | 5/2015 | Jain | G06F 8/71 |
| | | | | 717/121 |
| 2016/0239402 | A1* | 8/2016 | Zieder | G06F 8/60 |
| 2016/0357518 | A1* | 12/2016 | Gupta | G06F 9/453 |
| 2016/0357660 | A1* | 12/2016 | Dean | G06F 11/3692 |
| 2017/0031663 | A1* | 2/2017 | Daniel | G06F 8/36 |
| 2017/0199737 | A1* | 7/2017 | Bofferding | G06F 8/76 |
| 2018/0314517 | A1* | 11/2018 | Iwanir | G06F 8/71 |
| 2018/0329931 | A1* | 11/2018 | Baid | G06F 9/547 |
| 2019/0205121 | A1* | 7/2019 | Ericson | G06F 8/71 |

OTHER PUBLICATIONS

Amazon Web Services, AWS CodeCommit: User Guide, API Version Apr. 13, 2015; 350 pages. (Year: 2015).*
Casalnuovo, GitcProc: A Tool for Processing and Classifying GitHub Commits, ISSTA'17-DEMOS, Jul. 2017, Santa Barbara, CA, USA. ACM. 978-1-4503-5076-1/17/07. Published Jul. 2017. (Year: 2017).*
Wikipedia, Web Entry for Commit (version control), https://en.wikipedia.org/wiki/Commit_(version_control); printed Oct. 24, 2019; 2 pages. (Year: 2019).*
Jackson, D. & Ladd, D.A., "Semantic Diff: A Tool for Summarizing the Effects of Modifications," ICSM, Sep. 1994, vol. 94, pp. 243-252.
Lahiri, et al., "SymDiff: A language-agnostic semantic diff tool for imperative programs," CAV, Jul. 2012, vol. 12, pp. 712-717.
Hawblitzel, et al., "Towards Modularly Comparing Programs using Automated Theorem Provers," International Conference on Automated Deduction, Jun. 2013, pp. 282-299.
Chockler, et al., Validation of Evolving Software, N. eds., Springer, 2015.

* cited by examiner

```
@@ -616,10 +617,10 @@ SSLVerifySignedServerKeyExchange(SSLCont hashOut.data = hashes + SSL_MD5_DIGEST_LEN;
      hashOut.length = SSL_SHA1_DIGEST_LEN;
-     if ((err = SSLFreeBuffer(&hashCtx, ctx)) != 0)
+     if ((err = SSLFreeBuffer(&hashCtx)) != 0)
         goto fail;

-     if ((err = ReadyHash(&SSLHashSHA1, &hashCtx, ctx)) != 0)
+     if ((err = ReadyHash(&SSLHashSHA1, &hashCtx)) != 0)
         goto fail;
      if ((err = SSLHashSHA1.update(&hashCtx, &clientRandom)) != 0)
         goto fail;
@@ -627,6 +628,7 @@ SSLVerifySignedServerKeyExchange(SSLCont
         goto fail;
      if ((err = SSLHashSHA1.update(&hashCtx, &signedParams)) != 0)
         goto fail;
+        goto fail;
      if ((err = SSLHashSHA1.final(&hashCtx, &hashOut)) != 0)
         goto fail;

@@ -643,8 +645,8 @@ SSLVerifySignedServerKeyExchange(SSLCont
   }
 fail:
-     SSLFreeBuffer(&signedHashes, ctx);
-     SSLFreeBuffer(&hashCtx, ctx);
+     SSLFreeBuffer(&signedHashes);
+     SSLFreeBuffer(&hashCtx);
      return err;

}
```

402A, 402B, 402C, 402D

IMPROPER CHANGE 404

*FIG. 4*

```
                    goto fail;
                    goto fail;
            if ((err = SSLHashSHA1.final(&hashCtx, &hashOut)) != 0)
                    goto fail;

err = sslRawVerify(ctx,
                           ctx->peerPubKey,
                           dataToSign,      /* plaintext */
                           dataToSignLen,   /* plaintext length */
                           signature,
                           signatureLen);
        if(err) {
          sslErrorLog("SSLDecodeSignedServerKeyExchange: sslRawVerify "
                      "returned %d\n", (int)err);
          goto fail;
        }
```

SEMANTIC CHANGE INDICATORS 502

TARGETED SECURITY MONITORING USING SEMANTIC BEHAVIORAL CHANGE ANALYSIS

BACKGROUND

Most software under active development changes extremely often—perhaps even multiple times each day—which is typically the case for widely-used open source software. As a result, frequent changes to these projects may introduce new and beneficial features or eliminate bugs, though other changes may introduce other unwanted behaviors, such as security vulnerabilities. Likewise, such problems also occur in non-open source software projects, especially those for complex systems, projects involving many developers, etc.

Thus, it is extremely difficult for users and organizations—especially those with extremely sensitive or mission-critical systems—to be able to keep any open-source software it utilizes up to date, which may result in old, vulnerable versions of software continuing to be used until newer releases can be verified to be safe for use. Moreover, some users who require high assurance may be hesitant to depend on open-source software due to its often unpredictable and evolutionary growth, and thus the potential benefits of code reuse are not able to be realized.

BRIEF DESCRIPTION OF DRAWINGS

Various embodiments in accordance with the present disclosure will be described with reference to the drawings, in which:

FIG. 4 is a diagram illustrating an exemplary syntactic difference for a code commit introducing a data security issue.

FIG. 5 is a diagram illustrating an exemplary semantic difference generated by a mutation monitor corresponding to the code commit of FIG. 4 as part of targeted security monitoring using semantic behavioral change analysis according to some embodiments.

DETAILED DESCRIPTION

Figure 1:
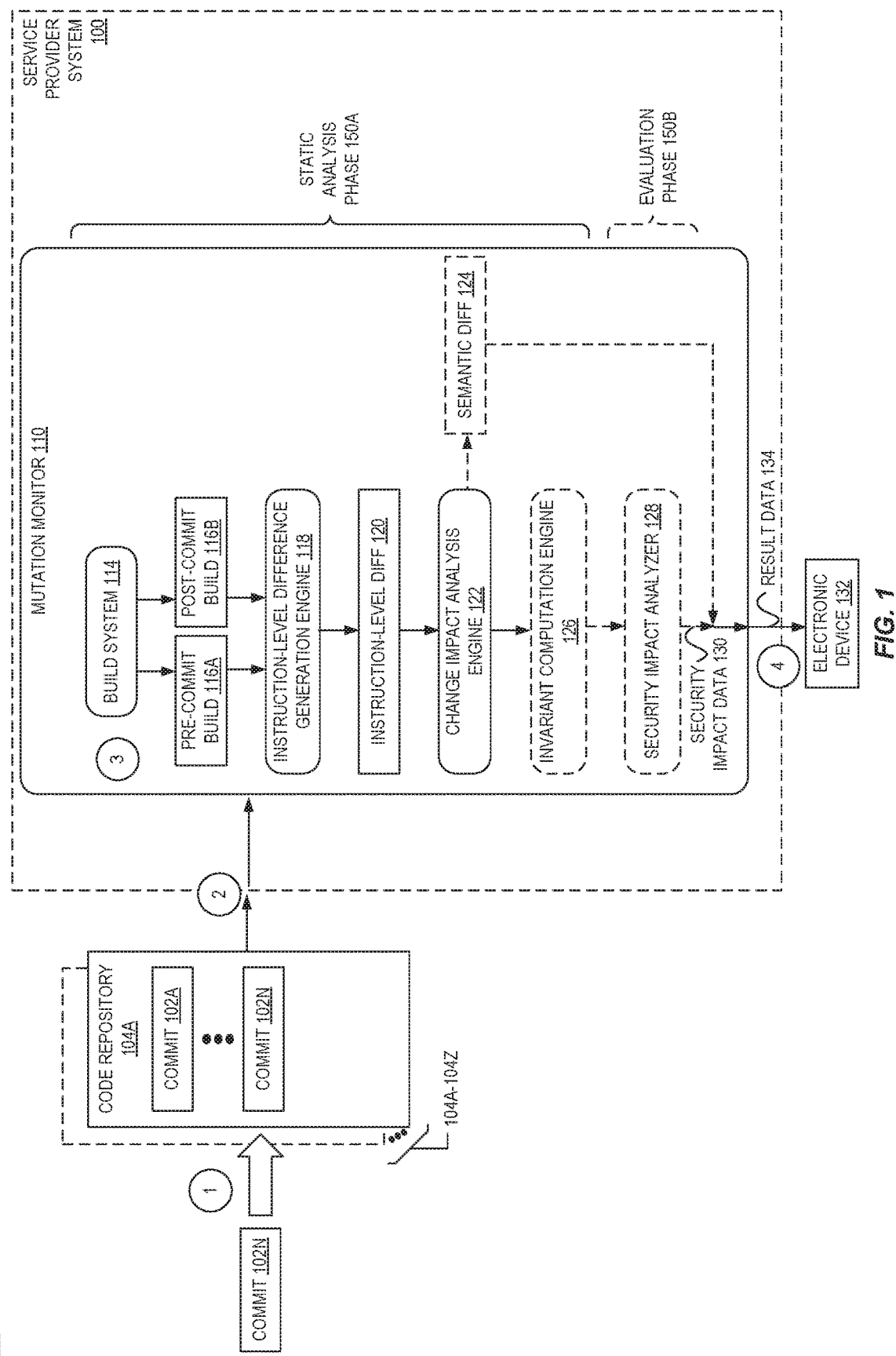
FIG. 1 is a block diagram illustrating an environment including a mutation monitor for targeted security monitoring using semantic behavioral change analysis according to some embodiments.

Various embodiments of methods, apparatus, systems, and non-transitory computer-readable storage media for targeted security monitoring using semantic behavioral change analysis are described. In some embodiments, a mutation monitor can detect security vulnerabilities introduced at the time of a code check in to a software project. The mutation monitor utilizes program analysis techniques that discover security vulnerabilities in new semantic behaviors introduced by a code check in, rather than in the entire codebase of a project. By focusing the field of security analysis to the new behaviors resulting from a code check-in, the speed and scalability of the security analysis may allow for nearly "real-time" security impact analysis of software projects as they change, and may ensure that only new vulnerabilities will be found rather than existing (and possibly known and embargoed) vulnerabilities that may be in already deployed systems.

In some embodiments, the mutation monitor generates, as part of the overall security analysis, semantic differences (or "diffs") that indicate behavioral differences resulting from the application of a code check-in (or "commit"). The semantic diffs, in some embodiments, comprise syntactic diffs that are annotated with indicators of control dependencies and/or data dependencies that have changed as a result of the commit. As a result, in some embodiments code reviewers can be presented with a semantic diff that illustrates both changes in the code's syntax (e.g., line-by-line changes) as well as changes in the code's behavior that would result from the committed code being applied and executed. Semantic diffs can thus provide code reviewers with additional visibility into potential adverse effects of a code change that may not be discernable from examining syntactical diffs alone.

In some embodiments, the mutation monitor acts as a service in which users can subscribe to security vulnerability updates from one or more different software packages. The mutation monitor can perform program analysis to discover any security vulnerabilities in new semantic behaviors introduced by code check ins for the one or more software packages, and may send notifications to the users when potential security issues are detected.

In some embodiments, the mutation monitor can provide results from the security vulnerability analysis for each code commit of one or multiple software packages, such as via a webpage or display within an application. For example, each commit may have an associated security risk value, e.g., "red" when a confirmed vulnerability has been detected as being introduced by the commit, "yellow" when a possible security vulnerability has been detected as a result of the commit, and "green" when no known security vulnerabilities have been detected as a result of the commit. Alternatively or additionally, each software package may have an associated security risk value, e.g., "red" when at least one confirmed vulnerability has been detected as being introduced by a previous commit and that still exists, "yellow" when a possible security vulnerability has been detected as a result of at least one commit that still exists, "green" when no known security vulnerabilities have been detected in previous commits and/or when any previous confirmed or potential vulnerabilities had been detected but that the vulnerability no longer exists, such as when it is addressed in a more-recent commit.

The mutation monitor, in some embodiments, operates within (or as a part of) a service provider system, in which users may utilize the security vulnerability results to determine which updates (or versions) of software packages they desire to utilize within the service provider system (e.g., within a virtual machine or other software project executing within the service provider system). In some embodiments, users may configure the service provider system to automatically apply (or "deploy") commits of a software package meeting or exceeding a threshold security risk value (e.g., "green") to the software as it exists within the user's service provider system resources, while blocking or asking for user instructions when a security risk value meets other conditions—e.g., block when "red", ask for instructions for "yellow."

In some embodiments, the mutation monitor may also act as part of a continuous integration system, in which a code commit to a code repository is analyzed by the mutation monitor to generate a semantic diff that can be provided to one or more users—e.g., a code manager, the committing user—to assist in determining whether a version of the software project is to be deployed to one or more servers, whether code commits will be accepted into the project, etc. The mutation monitor can also perform security vulnerability analysis to determine whether a commit introduces a security vulnerability, and generate and provide a description of any identified potential security vulnerabilities and/or security risk values for the commit.

For example, FIG. 1 is a block diagram illustrating an environment including a mutation monitor 110 for targeted security monitoring using semantic behavioral change analysis according to some embodiments. The mutation monitor 110 may optionally operate as part of a service provider system 100, and may comprise one or more software modules executed by one or more electronic devices at one or more data centers and/or geographic locations.

The environment also includes one or more code repositories 104A-104Z. Source code repositories, which are often referred to as revision (or version) control systems, are applications predominantly used by individuals and organizations to store source code, and typically updates to the source code, for software projects. Various types and organizational structures for source code repositories—or "repos"—exist that are in common use, such as distributed repositories like Git or Mercurial or centralized repositories such as Subversion. Many source code repositories allow users to perform a set of operations, such as changing a software project via "committing" (e.g., adding, editing, and/or removing files of a software project), creating branches, viewing the software project, etc. Although some source code repositories are private and thus are only accessible to a limited number of people, some source code repositories are publicly available. The open source community has been especially reliant on publicly available source code repositories that allow distributed teams to work on common tasks together in a cohesive manner Many open source software projects are hosted in some of these types of repositories, such as projects for web servers, e-commerce platforms, internet browsers, office suites, games, operating systems, software libraries, etc. For example, some popular source code repository systems host thousands or millions of individual source code repositories, and it has been reported that some of these repository systems may receive over 100,000 commits per day.

Thus, a code repository 104 may store source code, and typically updates to the source code (referred to herein as "check-ins" or "commits"), for software projects. Some code repositories 104A-104Z can be accessed in a variety of ways—e.g., using a variety of protocols and/or interfaces. As one example, some code repositories 104A-104Z are accessible via a command line interface (CLI), via a web browser or application, or both. In this example, the code repositories 104A-104Z may be public or private (provided that the mutation monitor 110 is granted access), centralized or decentralized, be web-based and/or available via another protocol, etc.

As illustrated in FIG. 1, code repository 104A includes a plurality of commits 102A-102N for a software project (or "package"). A commit may include a data structure indicating (or including) one or more changes to be made to one or more files/objects of the software project. A commit may also include commit metadata, such as a data of the commit, a name of the committing user, an email address of the committing user, a commit message describing the change, and/or control metadata detailing how the commit fits into the software project (e.g., an identifier of a "parent" commit).

As shown in FIG. 1, a commit 102N may be added or "checked-in" to the code repository 104A at a point in time represented by circle '1'. This check-in may occur upon a user executing a commit command (e.g., in a CLI or application) that causes the user's computing device to send the commit 102N to the code repository 104A.

The mutation monitor 110, at circle '2', obtains the commit 102N (independently, or together with the rest of the commits 102A-102M) from the code repository 104A. For example, the mutation monitor 110 may be configured to periodically send request messages to the code repository 104A asking for any "new" commits (e.g., from a point in time or from the reference of a particular commit), and in response the code repository 104A may send response messages indicating that no new commits exist, or including any such commits when they do exist. As one such example, the mutation monitor 110 may "poll" the code repositories 104A-104Z by, e.g., periodically (e.g., every minute, hour, day) send HyperText Transfer Protocol (HTTP) GET requests to a notification application programming interface (API) endpoint provided by the code repositories 104A-104Z. In other embodiments, the mutation monitor 110 initiates or performs another type of synchronization process to acquire new commits, or the code repository 104A may be configured to send new commits to the mutation monitor 110 (e.g., commit notifications are emailed from the code repositories 104A-104Z to an email account accessible to the mutation monitor 110), or the entire code repository 104A may be provided to (e.g., downloaded by) the mutation monitor 110, etc.

Regardless of the technique in which the commit 102N (and possibly previous commits 102A-102M) are provided to the mutation monitor 110, the mutation monitor 110, at circle '3', performs analysis operations for targeted security monitoring using semantic behavioral change analysis with regard to the commit 102N.

In some embodiments, to generate a semantic difference introduced by a single code change (represented by commit 102N), the instructions affected by the modification are computed. In some embodiments, this difference is computed at the level of "compiled" code (which could be assembly-level code, C code, etc.) by detecting changes to execution semantics. Thus, rather than just calculating the difference between two text files, which would flag line-by-line changes including whitespace differences (as is done in syntactic diffs), the instruction-level differences between two (compiled) programs—one built from the code before the change and one built from code after the change—are generated that would reflect execution semantic changes (e.g., via different instructions being utilized). One benefit to this approach is that even changes outside the immediate source code files, such as build environment modifications, can be reflected in the instruction-level difference. For example, building a set of source code files using a newer compiler version would result in changes that would be detected by an instruction-level comparison, although such a change would not be detected simply by examining the text source code files, as the source files themselves have not changed.

Accordingly, in some embodiments, the operations of circle '3' include two technical phases—a static analysis phase 150A (e.g., to compute semantic differences) and an evaluation phase 150B (e.g., to identify and report upon introduced security concerns).

In some embodiments, in the static analysis phase 150A the mutation monitor 110 utilizes a build system 114 to generate one or more builds of the software project using data of the code repository 104A. The build system 114 may be a compiler for a particular programming language (e.g., Java, C, C++) that can generate binaries (or other representations of a program including instructions that may or may not be directly executable) such as those typically used by verification or testing tools (e.g., the SATABS ("SAT-based Predicate Abstraction for ANSI-C") verification tool for ANSI-C and C++ programs, CBMC (the "C bounded model checker"), etc.). As one example, the build system 114 can utilize the goto-cc compiler, which is part of CBMC, that compiles programs written in C or C++ into GOTO-programs (i.e., control-flow graphs or "GOTO-binaries").

Thus, the build system 114 of the mutation monitor 110 in some embodiments builds a first version of the software project (pre-commit build 116A) representing a point in time before the existence of the commit 102N—i.e., using a version of the project after commit 102M is applied but before commit 102N is applied. In some embodiments, the generation of the pre-commit build 116A occurs synchronously with the analysis of a particular commit (e.g., commit 102N), though in some embodiments the mutation monitor 110 may instead obtain the pre-commit build 116A (e.g., from a cache, database, object storage service) generated during previous security analysis operations for a previous commit (e.g., commit 102M).

In some embodiments, the build system 114 of the mutation monitor 110 builds a second version of the software project (post-commit build 116B) representing a point in time after the existence of the commit 102N—i.e., using a version of the software project after commit 102N has been applied.

The pre-commit build 116A and/or post-commit build 116B, in some embodiments, is cached or stored by the mutation monitor 110 in a local or remote location for further use, such as in a mutation monitor specific cache, in a memory or disk, in a database, in an object store service, etc. In this case, as indicated above, the mutation monitor 110 may need the build system 114 to only build a "new" post-commit build 116B, and my instead access the pre-commit build 116A from a cache or other storage location, which may be substantially faster.

With the two builds 116A-116B, an instruction-level difference generation engine 118 can compute the differences between the builds 116A-116B (e.g., at the level of the compiled code) to yield an instruction-level difference 120. In some embodiments, an instruction-level difference will indicate instruction-level changes that affect execution semantics, as opposed to non-semantic differences such as changes in whitespace in source code, for example. The instruction-level difference generation engine 118 can comprise, for example, the goto-diff program of the bounded model checker CBMC application, though other programs exist or could be created by those of skill in the art to compute instruction-level differences between the builds 116A-116B.

In some embodiments, control-flow and data dependencies of the noted changes are computed by the mutation monitor 110. This change-impact analysis provides further context to the changes introduced by the commit 102N, and allows for an indication of how changes may affect the behavior of the program as a whole.

For example, in some embodiments, a change impact analysis engine 112 utilizes the instruction-level difference 120 to compute a "change impact" indicating the control-flow and data dependencies that behaviorally result from the commit 102N. Techniques for impact analysis, including identifying control-flow and data dependencies, are known to those of skill in the art (e.g., within the field of compilers), and could include adapting, for example, the SymDiff semantic differencing tool or other impact analysis tools. The mutation monitor 110 may then, in some embodiments, use any identified control-flow and/or data dependencies to generate a semantic difference 124.

A semantic difference 124, in some embodiments, is built by annotating a syntactic difference (not illustrated) corresponding to the commit 102N (as compared to the previous state of the software project) with the control-flow and/or data dependencies identified by the change impact analysis engine 122. A syntactic difference, or simply a "diff," is a representation of differences between two (typically plain-text) code segments. Commonly, syntactic differences can be generated by the code repositories 104A-104Z (or an application used to interface with the code repositories 104A-104Z, or an independent program such as the "diff" utility originally developed for Unix) to calculate line-by-line differences between two files (or groupings of files, such as those of a software project), which may represent two different states of a software project—before and after a commit is applied.

The syntactic difference may then be annotated to yield the semantic difference by inserting information describing modified control flow dependencies and/or modified data dependencies that were identified by the change impact analysis engine 112. Thus, in contrast to the syntactic difference that only shows the literal syntactical changes brought on by the commit, the semantic difference additionally shows control-flow and/or data dependency changes, which provide further context to the changes of the commit in terms of the behavioral changes that result. As presented later herein with regard to FIG. 4 and FIG. 5, semantic differences provide a substantial improvement over the use of plain syntactic differences to understand how the software project is changing, and can allow for bugs to more easily be detected due to the presence of control-flow and/or data dependency changes where they may have been unexpected. For example, if a commit were to make a change to a "line 5" of a code file, that change might affect the execution that occurs later on in the code, such as at "line 243", where a different execution path may be taken. Thus, a syntactic difference alone would should the change to line 5, whereas the semantic difference shows the dependency change and more clearly shows the impact—i.e., the change in execution path at line 243—resulting from the earlier change at line 5.

In some embodiments, the mutation monitor 110 further includes an invariant computation engine 126 which, using the change impact computed by the change impact analysis engine 112, computes invariants that describe execution traces existing in the change impact. As is known, in computer science, an invariant is a condition that can be relied upon to be true during execution of a program, or during some portion of it. An invariant is a logical assertion that is held to always be true during a certain phase of execution. For example, a loop invariant is a condition that is true at the beginning and end of every execution of a loop. In the field of compiler research, a variety of abstract interpretation tools exist and are being further developed that can compute invariants of given imperative computer programs (or representations thereof) to find particular types of properties. Abstract interpretation tools can be thought of as performing a partial execution of a computer program to gain information about its semantics (e.g., control-flow, data-flow) without actually performing all the calculations, which can be useful for compilers (e.g., to identify optimizations or transformations) or for debugging purposes (e.g., to identify certain classes of bugs).

In some embodiments, the invariant computation engine 126 infers types of invariants that track one or more security properties, allowing for deviations from the security properties to be identified. For example, in some embodiments the one or more security properties are for one or more of: memory corruption (e.g., such as integer overflows, division by zero, undefined shifts), uncaught exceptions (e.g., such as in Java or C++ programs), incorrect usage of security-oriented APIs (e.g., for Transport Layer Security (TLS) or Secure Sockets Layer (SSL) use), the existence of logic bombs (code intentionally inserted into a software system that will set off a malicious function when specified conditions are met), changes in behavior of authentication and/or authorization code, changes in behavior of privilege escalation code, etc. As a result, potential security issues resulting from the commit can be identified using the inferred variants.

The mutation monitor 110 may also, via a security impact analyzer 128, perform an evaluation phase 150B via a security impact analyzer 128, which can use hints provided from the static analysis phase 150A—e.g., line numbers, code blocks, etc.—to perform a more fine-grained security evaluation of those parts of the software project, as opposed to performing a security evaluation of the entire security project as a whole. The security impact analyzer 128 may comprise, for example, one or more software program analysis tools known to those of skill in the art or in the field of program analysis research.

For example, in some embodiments once the mutation monitor 110 has computed and gathered the required static analysis results, the commit is evaluated by the security impact analyzer 128 for its security implications. A commit may then be classified as either safe or possibly harmful, using the security properties (see above) combined with metrics to estimate the overall quality of a source package. In some embodiments, the security impact analyzer 128 generates, as output, security impact data 130 comprising a security risk value (e.g., a category such as "red" or "yellow" or "green" as described above, a numeric value, a ranking, etc.) indicating a security risk of the commit. In some embodiments, the security impact data 130 includes a security description explaining the security status of a commit and/or the software package after the commit would be applied. For example, a security property that is (or is not) satisfied can be indicated in the description—e.g., "possible information leak", "possible invalid memory access", etc.

At circle '4', the mutation monitor 110 provides or causes result data 134 including the security impact data 130 and/or the semantic difference 124 to be transmitted to an electronic device 132 of a user. For example, the mutation monitor 110 may act together with a website (or API) providing result data 134 including the security impact data 130 for one or more software projects, and thus the result data 134 may be transmitted in response to a user's request sent to the website (or API). As another example, the mutation monitor 110 may be part of a continuous integration system and thus may provide the security impact data 130 to be provided to a developer (e.g., the person who created the commit) or a code reviewer via a webpage or other electronic message. Accordingly, in some embodiments, the result data 134 includes the security impact data 130 from the security impact analyzer 128 (e.g., security risk value(s), security description(s), etc.), and in some embodiments the result data 134 may also or alternatively include the semantic difference 124 and/or syntactic difference.

Accordingly, in various embodiments, the mutation monitor 110 can perform behind-the-scenes automatic security analysis that continuously looks at changes to software projects, such as critical open-source code, and report the results in close to "real" time. Thus, security vulnerabilities may be detected very quickly after when they are introduced, and in many cases before the code is actually deployed, which is in stark contrast to other approaches that find security vulnerabilities after deployment, which must then be embargoed.

Additionally, in some embodiments the security analysis is designed only to examine changes in a project's code, and not the entire code body. Further, in some embodiments, the analysis is looking for security vulnerabilities introduced that are introduced, and not for security vulnerabilities that were "lurking" in the codebase before the change. Thus, the amount of security analysis performed (e.g., by the security impact analyzer 128) can be quite thorough while not dramatically effecting performance due to its focused approach only on certain parts of the code.

Figure 2:
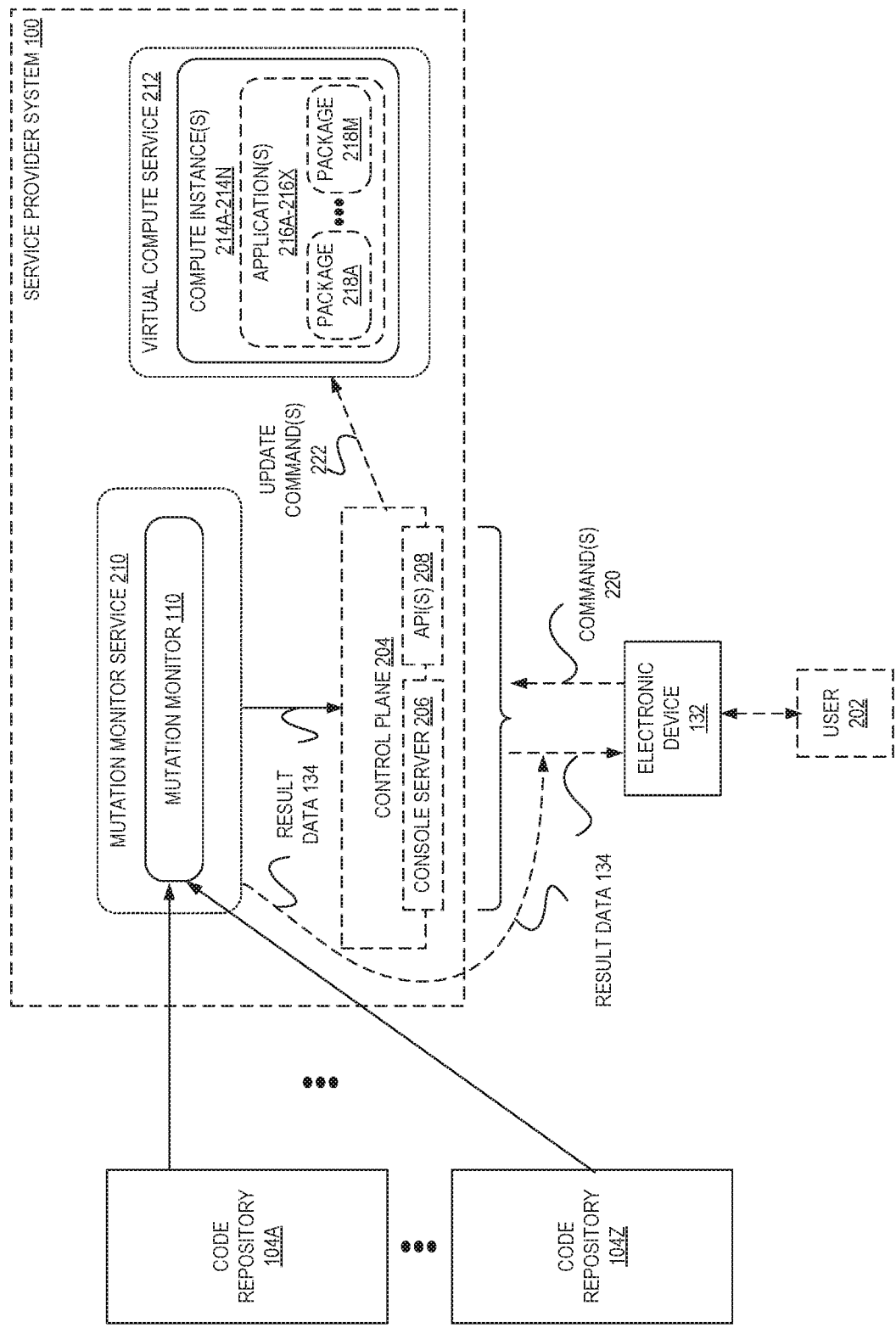
FIG. 2 is a diagram illustrating a mutation monitor as part of a mutation monitor service for targeted security monitoring using semantic behavioral change analysis according to some embodiments.

One example of a useful deployment of a mutation monitor is shown in FIG. 2, which is a diagram illustrating a mutation monitor 110 as part of a mutation monitor service 210 for targeted security monitoring using semantic behavioral change analysis according to some embodiments. In this example environment, the mutation monitor service may provide results of security vulnerabilities of one or multiple code repositories 104A-104Z as result data 134, which may occur by sending the result data 134 "directly" to the electronic device 132 (e.g., as part of a webpage or user interface of an application) via a web server of the mutation monitor service 210, for example. Exemplary user interfaces will be discussed later herein with reference to FIG. 8 and FIG. 9.

Additionally or alternatively, the result data 134 may be provided to the electronic device 132 of a user 202 via a console server 206 of a control plane 204 of the service provider system. The console server 206 may provide the user 202 with access to a management console for managing resources and/or services implemented within the service provider system 100.

For example, the user 202 may be provided, via the console server 206, webpages allowing the user 202 to monitor the security vulnerability status—e.g., security impact data 130—of one or more software packages 218A-218M that the user 202 may be using as (or as part of) one or more applications 216A-216X implemented by the service provider system 100. For example, in some embodiments the user 202 may cause the service provider system 100 to provision (or utilize) one or more compute instance(s) 214A-214N (e.g., virtual machines (VMs), containers) for the user 202. The compute instance(s) 214A-214N may utilize one or more of the packages 218A-218M (e.g., as part of a guest operating system), or the user 202 may deploy one or more applications 216A-216X that include (or are) one or more packages 218A-218M corresponding to one or more of the code repositories 104A-104Z. The one or more software packages 218A-218M may be "private" to the user 202, publicly-available, or a mix of both.

In some embodiments, the security impact data 130 (e.g., as part of result data 134) may be displayed to the user 202 via a user interface and in response, the user 202 may cause (e.g., via a user input) the electronic device 132 to send one or more commands 220 back to the control server 206. For example, the commands 220 may indicate to the control plane 204 that the user 202 desires for certain ones of the packages 218A-218M to be installed or updated to a particular point—e.g., up to a particular commit or version— causing the control plane 204 to send update commands 222 to cause the intended operations. As another example, the commands 220 may indicate to the control plane 204 that the user 202 desires for one or more packages 218A-218M to be updated according to one or more conditions. For example, the commands 200 may indicate that the control plane 204 is to automatically apply (or "deploy") commits of a software package 218A that meet or exceed a threshold security risk value (e.g., "green", but not "yellow" or "red") to the software as it exists within the user's service provider system resources (e.g., package 218A), while blocking an update or asking for user confirmation when a security risk value meets other conditions—e.g., block when "red", ask for instructions for "yellow."

Additionally or alternatively, the service provider system 100 may implement one or more APIs 208 by providing API endpoints where a user 202 can cause an electronic device 132 to issue requests to in order to acquire result data 134 and/or send commands 220 as described above regarding package updates and/or update conditions.

Figure 3:
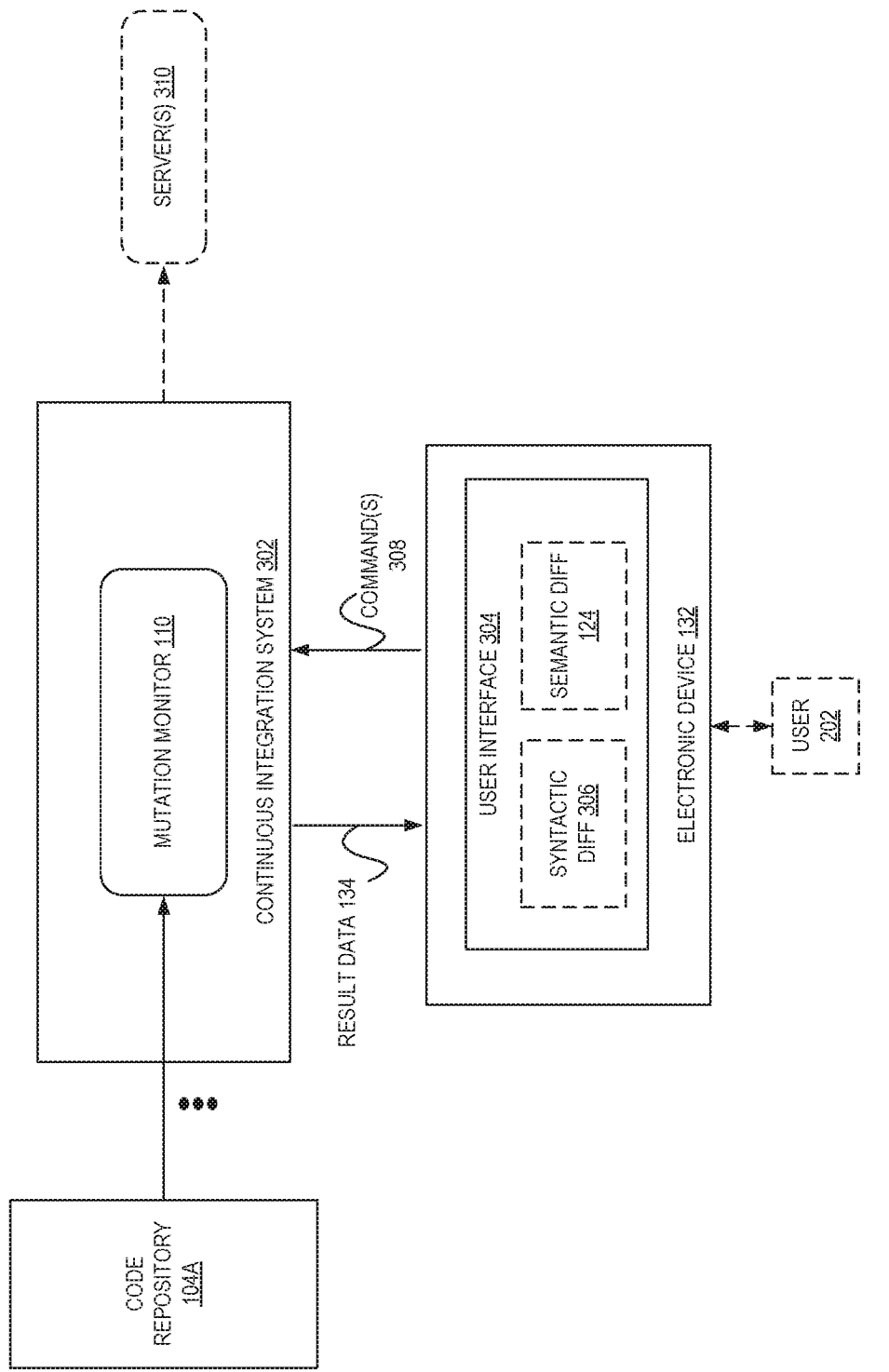
FIG. 3 is a diagram illustrating a mutation monitor as part of a continuous integration system for targeted security monitoring using semantic behavioral change analysis according to some embodiments.

As another example environment, FIG. 3 is a diagram illustrating a mutation monitor 110 as part of a continuous integration system 302 for targeted security monitoring using semantic behavioral change analysis according to some embodiments. In software engineering, continuous integration is the practice of merging developer working copies to a shared mainline often, such as several times a day. In this illustrated example, a code repository 104A may be integrated with the continuous integration system 302, where the associated software project may be built and/or subjected to a variety of tests to ensure the consistency and soundness of the software project as it changes over time. For example, in some embodiments, the continuous integration system 302 may build the software project from the code repository 104A and/or may perform targeted security analysis for one or more "recent" commits (e.g., one or more commits that have not been analyzed in the past since a previous analysis) as part of integration testing. As a result, the result data 134 associated with the overall software project and/or individual commits may be provided to one or more electronic devices 132 of a user 202 (e.g., a committing user, engineer, manager, etc.) to be displayed, via one or more user interfaces 304. In this example, a semantic difference 124 is displayed as part of the user interface 304, though in some embodiments other result data 134, including but not limited to a syntactic difference 306, security risk values, security description(s), etc. Thus, in some embodiments, it may be possible for a user 202 to quickly be provided results of security analysis shortly after "new" commits are added, and can allow the user 202 to, for example, address found vulnerabilities, deploy particular versions of the software project to one or more servers 310 (e.g., via commands 308), etc.

For the sake of understanding the benefits of semantic differences that may be generated by the mutation monitor in various embodiments, FIG. 4 is a diagram illustrating an exemplary syntactic difference 400 for a code commit that introduces a data security issue. As described herein, developers typically examine syntactic differences 400 when performing code reviews, deciding whether to merge a commit into a project, etc. This syntactic difference 400 shows line additions (i.e., lines of code added by a commit) and line subtractions (i.e., lines of code removed by a commit) using change identifiers 402A-402D, represented by plus signs ("+") and minus signs ("−") at the beginning of each line. Notably, syntactic differences 400 often do not easily allow users to detect flaws in a commit or unintended consequences resulting from a commit, often due to a large number of changes being made that obscure a flaw, or due to a change being made that affects non-illustrated code elsewhere in the project that affects the behavior of the software. In this example, a bug is introduced due to the improper change 404 of an accidental insertion of a "goto fail;" statement, shown with change identifier 402C. It is quite possible that a developer viewing this syntactic difference 400 would miss this improper statement.

However, FIG. 5 illustrates an exemplary semantic difference 500 generated by a mutation monitor corresponding to the code commit of FIG. 4 as part of targeted security monitoring using semantic behavioral change analysis according to some embodiments. This portion of an exemplary semantic difference 500 includes part of the syntactic difference 400 of FIG. 4—i.e., the top two lines—but also includes annotated control dependency data in the form of a large number of lines having semantic change indicators 502. In some embodiments, a detected addition of a control dependency is shown with a "C+" semantic change indicator 502, while detected removals of control dependencies can be shown with "C−", detected additions of data dependencies can be shown with "D+", and detected removals of data dependencies can be shown with "D−". In other embodiments, though, other semantic change indicators 502 can be used, such as different characters (or combinations of characters), icons, colors, graphics, or other visual indicators that help distinguish the annotated semantic change from the rest of the semantic diff. In this case, it is much more likely that the large block of semantic change indicators 502 and associated dependency data (from the change impact analysis) would be noted by a developer, and the new dependency that was unexpected would likely cause the developer to more closely scrutinize the nearby changed and/or unchanged code sections to find the problem.

The mutation monitor 110 and associated techniques disclosed herein are particularly beneficial due to the targeted—or constrained—nature of security analysis of commits to software projects, as opposed to the analysis of entire software projects. Thus, instead of traditional security-related techniques for performing somewhat similar types of analysis on large projects that may take hours or days to complete, embodiments can perform the more targeted analysis for a commit much faster—e.g., in seconds or minutes. However, in some deployment environments, it may be useful to increase the performance to provide even quicker security analysis feedback, or to allow more commits and/or projects to be analyzed at a time.

Figure 6:
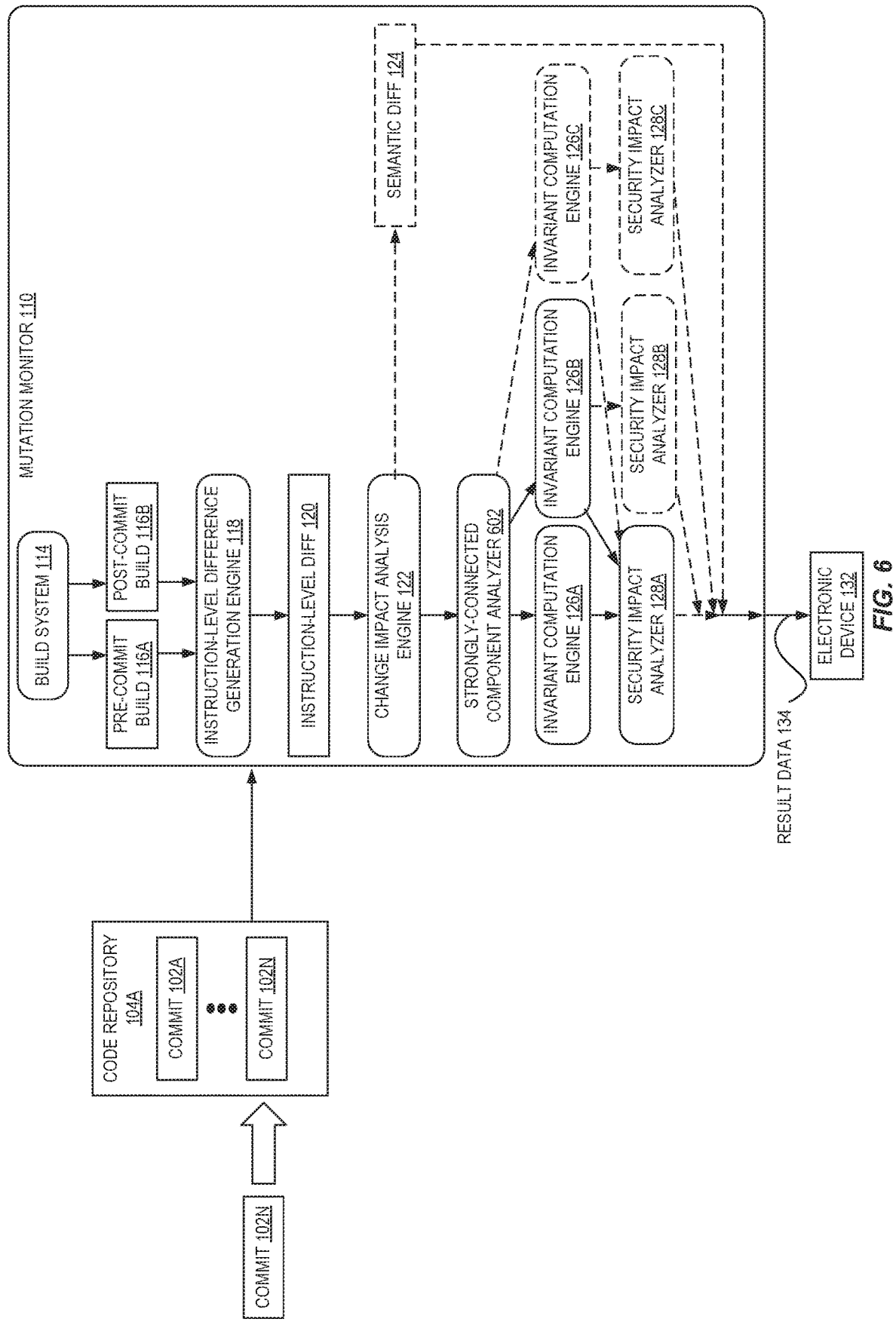
FIG. 6 is a diagram illustrating distributed analysis of a single code commit according to some embodiments.

As one example, FIG. 6 is a diagram illustrating distributed analysis of a single code commit (e.g., commit 102N) according to some embodiments. In this case, a single commit 102N may be processed at least in part in parallel. As shown, after the change impact analysis engine 122 a strongly-connected component analyzer 602 is included in the mutation monitor 110 that can identify multiple parts of the project impacted by the commit 102N that are "weakly connected" in that components within each part are strongly connected to each other while each part is not strongly connected to the other parts. For example, the strongly-connected component analyzer 602 may construct a graph involving various components of the software project—e.g., a control flow graph and/or data flow graph—where each component is a node in the graph. Then, the strongly-connected component analyzer 602 can apply one or more "cuts" to the graph to separate different nodes having portions needing to be analyzed (as determined by the change impact from the change impact analysis engine 122). The selection of the cuts can be performed, for example, using the well-known "minimum cut" algorithm from graph theory where a minimum cut of a graph is a cut—i.e., a partition of the vertices of a graph into two disjoint subsets that are joined by at least one edge—that is minimal in some sense. As one example, the cut may be selected so that the weight of the cut is based on an amount of interaction or dependencies between the components. Thus, one or more cuts can be made to create multiple parts to be analyzed. Strongly-connected component analysis algorithms can include or be based on, for example, Kosaraju's algorithm, Tarjan's strongly connected components algorithm, the path-based strong component algorithm, etc.

The parts may then be processed by different invariant computation engines 126A-126C and/or security impact analyzers 128A-128C, and the results can be consolidated by the mutation monitor 110 to form the security impact data 130 and thus the result data 134. In some embodiments, the invariant computation operations may be the most resource-intensive aspect of the mutation monitor's security analysis operations, and thus the distributed processing performed by multiple invariant computation engines 126A-126C—possibly implemented by multiple electronic devices—may significantly increase the speed at which the security vulnerability analysis can be performed for a particular commit 102N.

Figure 7:
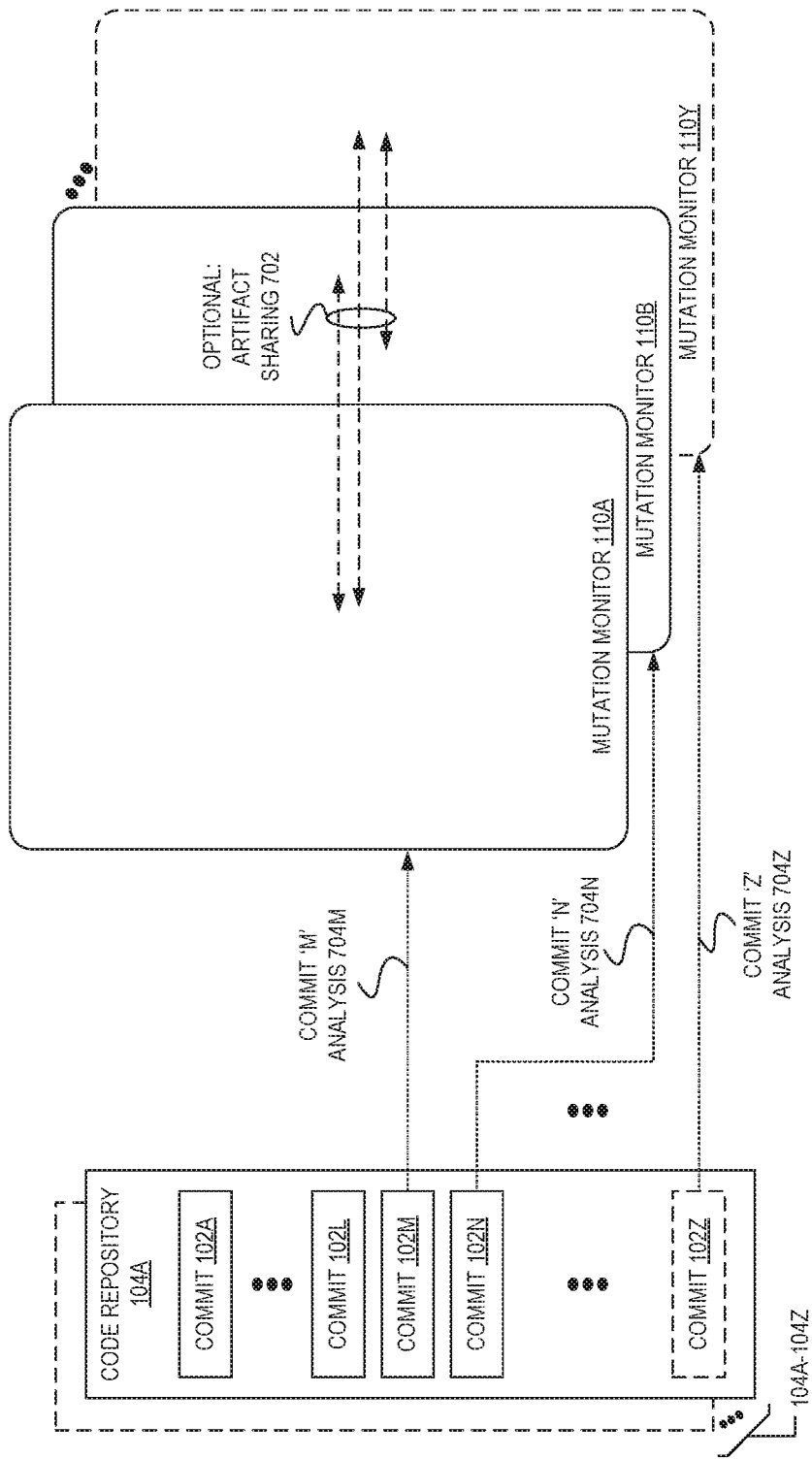
FIG. 7 is a diagram illustrating distributed analysis of multiple code commits according to some embodiments.

Another example is shown in FIG. 7, which is a diagram illustrating distributed analysis of multiple code commits according to some embodiments. In this example, multiple mutation monitors 110A-110Y can be used to perform the security vulnerability analysis of multiple commits, which can be of a same project or of different projects. For example, as shown, a first commit 102M may be analyzed by a first mutation monitor 110A while a second commit 102N may be analyzed by a second mutation monitor 110B and a Zth commit 102Z may be analyzed by a Zth mutation monitor 110Z.

In addition to the benefits resulting from parallel processing of multiple commits at once, in some embodiments, some or all of the mutation monitors 110A-110Y may further improve the performance by sharing certain artifacts 702. For example, to perform the analysis 704M for commit 102M, the first mutation monitor 110A may need to utilize a pre-commit build (e.g., corresponding to commit 102L) as well as a post-commit build (e.g., corresponding to commit 102M). Thus, the first mutation monitor 110A may generate the post-commit build for commit 102M, and directly or indirectly (e.g., via a shared storage or filesystem) provide this to the second mutation monitor 110B that can use the post-commit build for commit 102M as its pre-commit build (as it needs a build for commit 102M and commit 102N). Thus, it may be possible that only one mutation monitor that is performing targeted security vulnerability analysis for a code repository needs to build two builds, while the other mutation monitors may "share" an earlier-generated build and only need to perform one build (i.e., their post-commit build). Additionally, in some embodiments, other types of artifacts used in the targeted security vulnerability analysis may be common for all commits of a single code repository, and thus the mutation monitors may be able to share this data as well when the cost to obtain/share the data (e.g., in terms of computing resources and wait time) is less than the cost to generate it independently.

Figure 8:
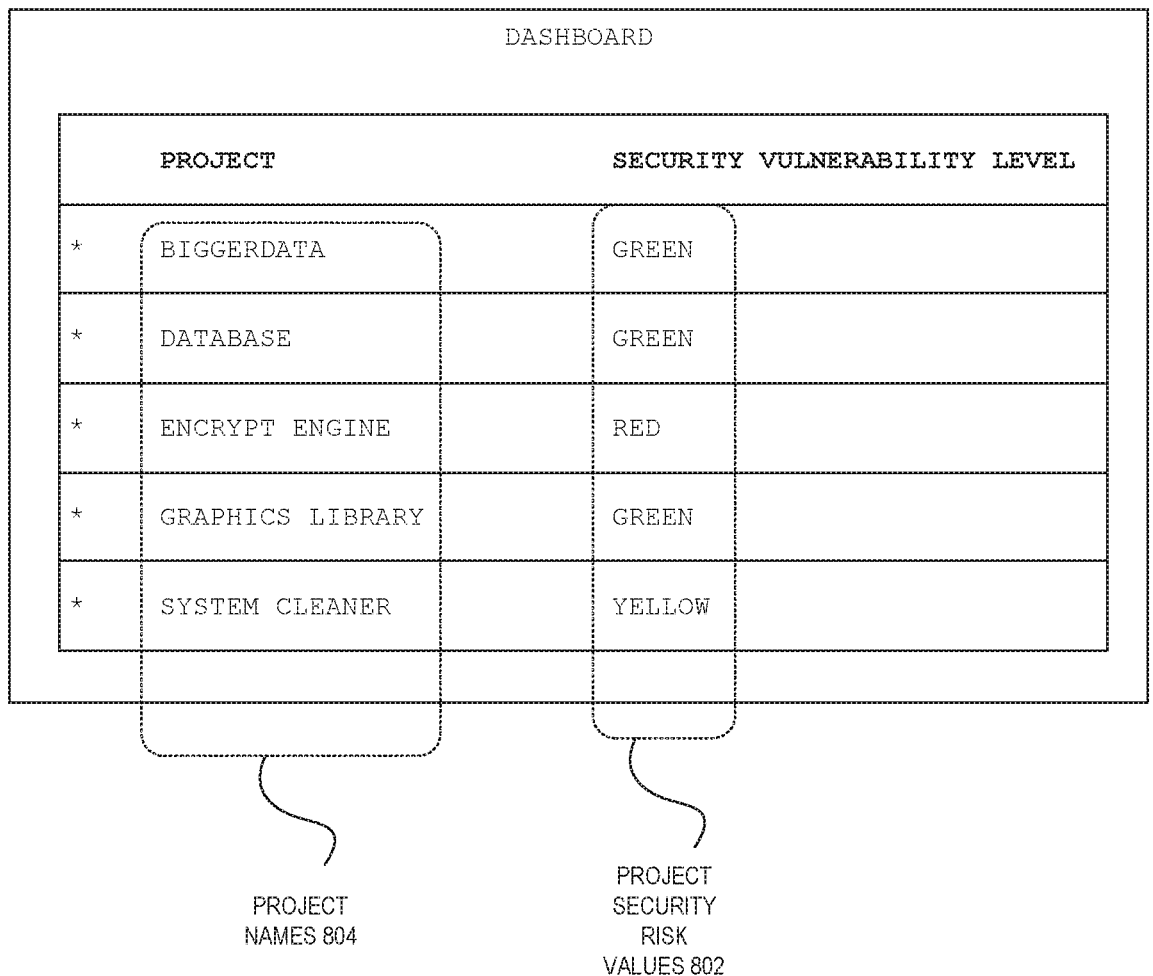
FIG. 8 is a diagram illustrating an exemplary user interface of a dashboard providing security monitoring results generated by a mutation monitor for multiple software projects according to some embodiments.

To provide the benefit of targeted security vulnerability analysis to users, in some embodiments result data 134 may be provided to an electronic device to be displayed or otherwise presented to a user. As one example, FIG. 8 is a diagram illustrating an exemplary user interface 800 of a dashboard providing security monitoring results generated by a mutation monitor for multiple software projects according to some embodiments. In this example, multiple projects in which targeted security vulnerability analysis is being performed are represented in tabular format, with a column of project names 804 and a column of corresponding project security risk values 802—here, "GREEN" or "YELLOW" or "RED" to indicate a security risk or vulnerability level of the overall project. In some embodiments, a project that does not have any existing detected security vulnerabilities due to commits may be labeled with GREEN, while projects with moderate or indeterminate security vulnerabilities may be labeled with YELLOW, and projects with confirmed security vulnerabilities may be labeled with RED.

Figure 9:
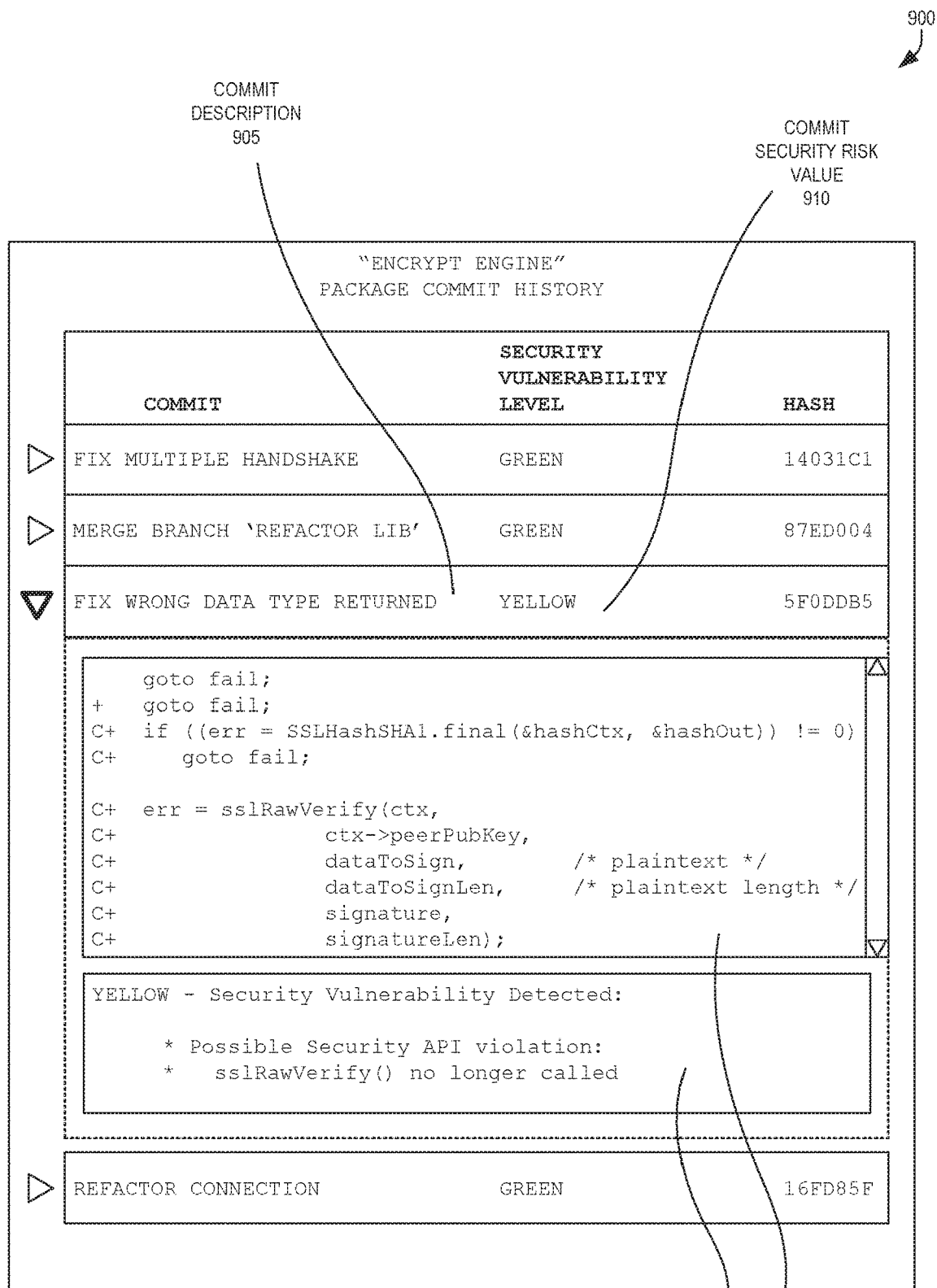
FIG. 9 is a diagram illustrating an exemplary user interface of a package commit history providing per-commit security monitoring results generated by a mutation monitor according to some embodiments.

As another example, FIG. 9 is a diagram illustrating an exemplary user interface 900 of a package commit history providing per-commit security monitoring results generated by a mutation monitor according to some embodiments. In this example, multiple commits are represented in multiple rows of a table. Upon a selection of a triangle icon for a commit with a commit description 905 of "FIX WRONG DATA TYPE RETURNED" and a generated commit security risk value 910 of YELLOW, a display area is presented that includes a region to show the generated semantic difference 124 and a corresponding commit security description 915. In some embodiments, the commit security risk value 910, semantic difference 124 and commit security description 915 are provided as part of result data 134 and presented to a user by electronic device 132.

Figure 10:
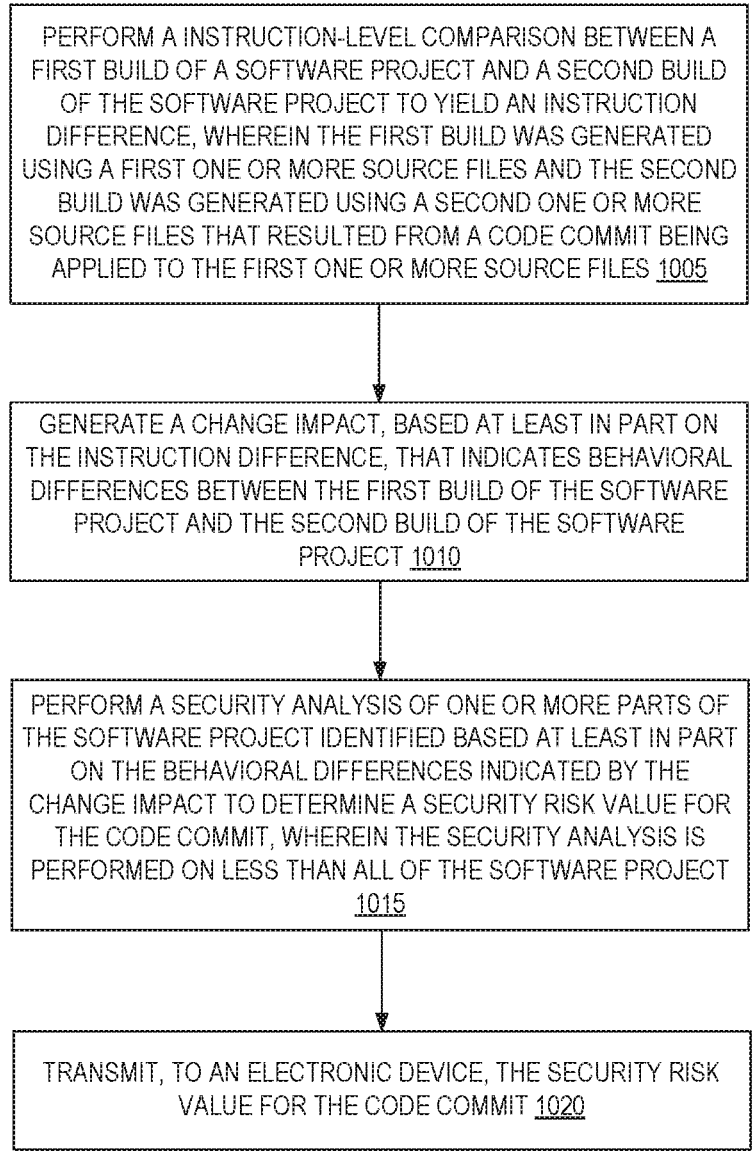
FIG. 10 is a flow diagram illustrating operations for targeted security monitoring using semantic behavioral change analysis according to some embodiments.

FIG. 10 is a flow diagram illustrating operations 1000 for targeted security monitoring using semantic behavioral change analysis according to some embodiments. Some or all of the operations 1000 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 1000 are performed by the mutation monitor 110 of the other figures.

The operations 1000 include, at block 1005, performing an instruction-level comparison between a first build of a software project and a second build of the software project to yield an instruction difference. The first build was generated using a first one or more source files and the second build was generated using a second one or more source files that resulted from a code commit being applied to the first one or more source files.

In some embodiments, the first build and the second build are performed using a build system comprising a compiler that can generate binaries such as those typically used by verification or testing tools. In some embodiments, block 1005 includes building both the first build and the second build, but in some embodiments block 1005 includes obtaining/retrieving the first build from a cache or storage location, which may have been previously built during another targeted security vulnerability analysis of a different code commit.

The operations 1000 also include, at block 1010, generating a change impact, based at least in part on the instruction difference, that indicates behavioral differences between the first build of the software project and the second build of the software project. In some embodiments, generating the change impact is performed by a change impact analysis engine 122 of the mutation monitor 110, which computes control-flow and data dependencies, introduced or modified by the code commit, from the instruction-level difference.

At block 1015, the operations 1000 include performing a security analysis of one or more parts of the software project identified based at least in part on the behavioral differences indicated by the change impact to determine a security risk value for the code commit. The security analysis is performed on less than all of the software project. In some embodiments, block 1015 includes (a) determining that the code commit has behavioral impacts to a plurality of weakly connected parts of the software project; (b) performing, by a first compute instance, a first program analysis of a first part of the plurality of weakly connected parts of the software project; and (c) performing, by a second compute instance, a second program analysis of a second part of the plurality of weakly connected parts of the software project. In some embodiments, the first compute instance and the second compute instance are executed by separate electronic devices.

In some embodiments, the first program analysis and the second program analysis each comprise computing invariants that describe traces of the software project, which may be performed by an invariant computation engine as disclosed herein. In some embodiments, the security analysis checks for an existence of one or more of a memory corruption; an uncaught exception; an incorrect usage of a security-related API; or a logic bomb.

The operations 1000 include, at block 1020, transmitting, to an electronic device, the security risk value for the code commit. The security risk value may be displayed or otherwise presented to a user as part of a user interface.

In some embodiments, the operations 1000 further include (a) generating a syntactic difference that reflects line-by-line differences between the first one or more source files and the second one or more source files that result from an application of the code commit to the first one or more source files, (b) generating a semantic difference by annotating the syntactic difference with one or more indicators of control or data dependencies introduced by changes of the code commit detected based on an analysis of the instruction difference, and (c) transmitting the semantic difference to the electronic device. The semantic difference may be displayed or otherwise presented to a user as part of a user interface.

In some embodiments, the operations 1000 further include (a) performing a plurality of security analyses for a plurality of software projects at parts of the plurality of software projects identified based at least in part on behavior differences indicated by a plurality of semantic differences to yield a plurality of security risk values; and (b) transmitting, to the electronic device, the plurality of security risk values. One or more of the plurality of security risk values may be displayed or otherwise presented to a user as part of a user interface. In some embodiments, the operations 1000 also include transmitting, to the electronic device, a security description corresponding to at least one of the plurality of security risk values that identifies a security condition detected to result from a corresponding code commit, wherein the security condition was identified as a result of the security analysis of the corresponding software project. The security description may be displayed or otherwise presented to a user as part of a user interface.

In some embodiments, the operations 1000 further include receiving, via application programming interface (API), a request to subscribe to security update information related to the software project. The operations 1000 may also include, responsive to performing another targeted security vulnerability analysis of another code commit for the software project, causing results (e.g., security impact data) of the targeted security vulnerability analysis to be transmitted to an electronic device of a user.

Figure 11:
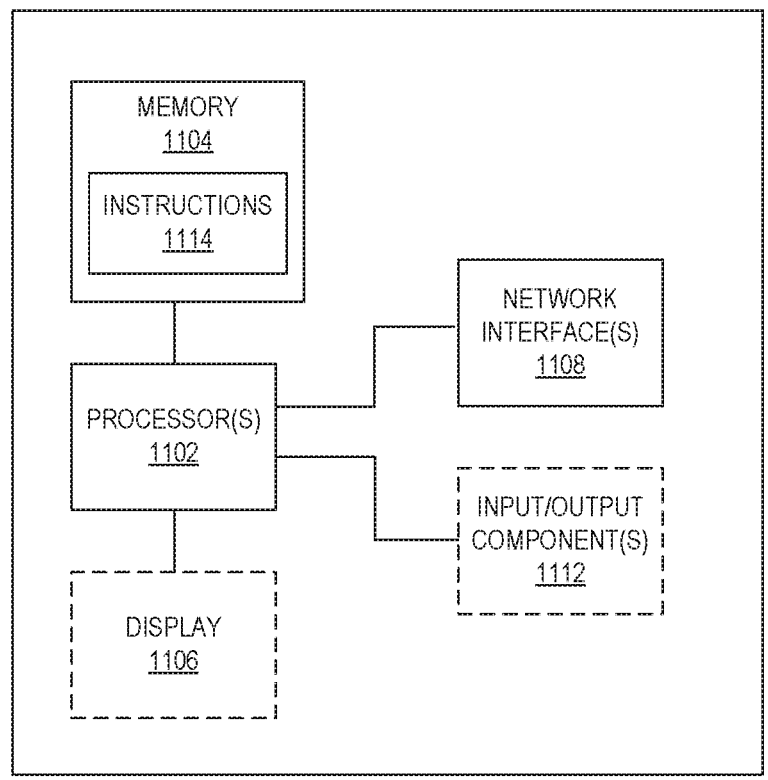
FIG. 11 illustrates a logical arrangement of a set of general components of an exemplary computing device that can be utilized in accordance with various embodiments.

FIG. 11 illustrates a logical arrangement of a set of general components of an example computing device 1100 such as electronic device 132 or an electronic server device implementing the mutation monitor 110, etc. Generally, a computing device 1100 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 1102 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 1104) to store code (e.g., instructions 1114) and/or data, and a set of one or more wired or wireless network interfaces 1108 allowing the electronic device to transmit data to and receive data from other computing devices, typically across one or more networks (e.g., Local Area Networks (LANs), the Internet). The coupling of the set of processors and other components is typically through one or more interconnects within the electronic device, e.g., busses and/or bridges. Thus, the non-transitory machine-readable storage media (e.g., memory 1104) of a given electronic device typically stores code (e.g., instructions 1114) for execution on the set of one or more processors 1102 of that electronic device. One or more parts of various embodiments may be implemented using different combinations of software, firmware, and/or hardware.

A computing device 1100 can include some type of display element 1106, such as a touch screen or liquid crystal display (LCD), although many devices such as portable media players might convey information via other means, such as through audio speakers, and other types of devices such as server end stations may not have a display element 1106 at all. As discussed, some computing devices used in some embodiments can include at least one input and/or output component(s) 1112 able to receive input from a user. This input component can include, for example, a push button, touch pad, touch screen, wheel, joystick, keyboard, mouse, keypad, or any other such device or element whereby a user can input a command to the device. In some embodiments, however, such a device might be controlled through a combination of visual and/or audio commands and utilize a microphone, camera, sensor, etc., such that a user can control the device without having to be in physical contact with the device.

Figure 12:
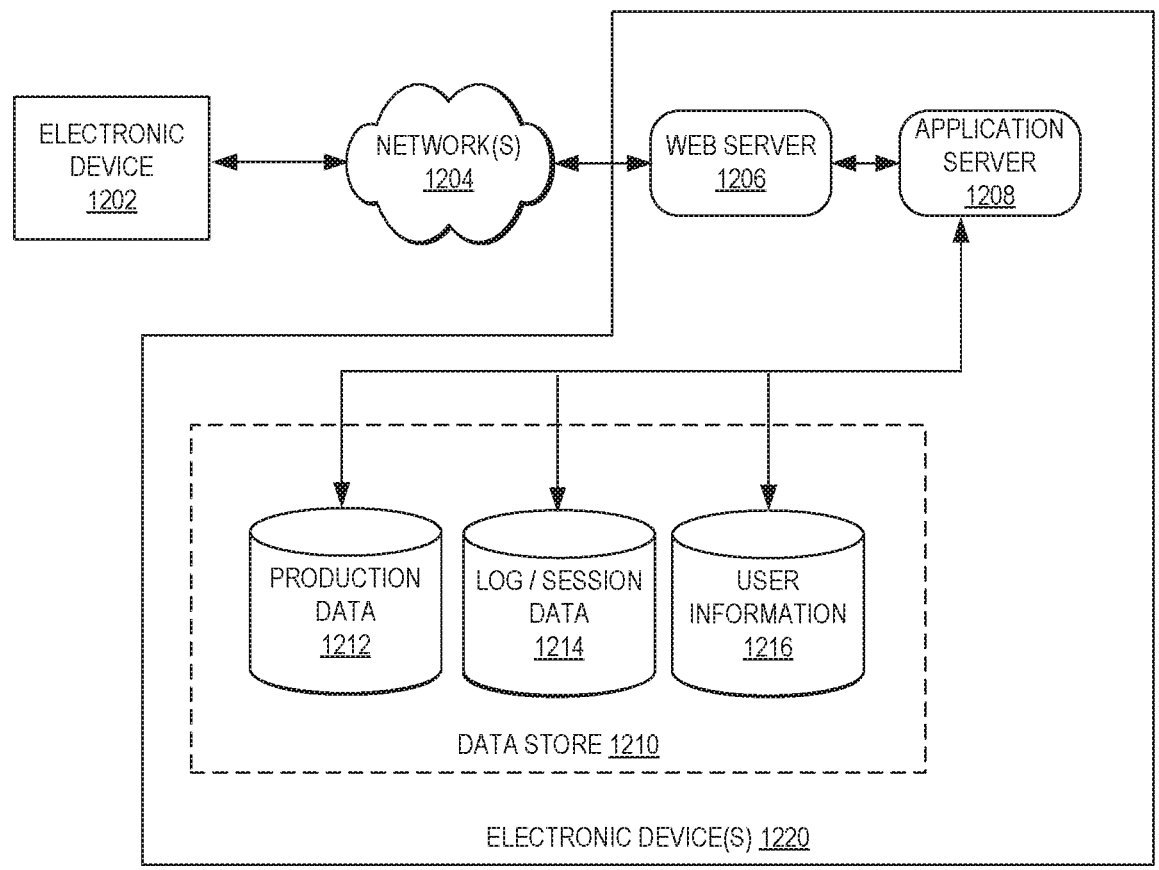
FIG. 12 illustrates an example of an environment for implementing aspects in accordance with various embodiments.

As discussed, different approaches can be implemented in various environments in accordance with the described embodiments. For example, FIG. 12 illustrates an example of an environment 1200 for implementing aspects in accordance with various embodiments. For example, in some embodiments users may interact with the service provider system 100 via electronic devices 1202 through use of a web portal provided via the web server 1206 and application server 1208. As will be appreciated, although a web-based environment is used for purposes of explanation, different environments may be used, as appropriate, to implement various embodiments. The system includes an electronic device 1202 (e.g., electronic device 132), which may also be referred to as a client end station and can be any appropriate device operable to send and receive requests, messages or information over an appropriate network 1204 or networks and convey information back to a user of the electronic device 1202. Examples of such an electronic device—or "client device"—include personal computers (PCs), cell phones, handheld messaging devices, laptop computers, set-top boxes, personal data assistants, electronic book readers, wearable electronic devices (e.g., glasses, wristbands, monitors), and the like. The one or more networks 1204 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 1204 includes the Internet, as the environment includes a web server 1206 for receiving requests and serving content in response thereto, although for other networks an alternative device serving a similar purpose could be used, as would be apparent to one of ordinary skill in the art.

The illustrative environment includes at least one application server 1208 and a data store 1210. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server 1208 can include any appropriate hardware and software for integrating with the data store 1210 as needed to execute aspects of one or more applications for the electronic device 1202 and handling a majority of the data access and business logic for an application. The application server 1208 provides access control services in cooperation with the data store 1210 and is able to generate content such as text, graphics, audio, video, etc., to be transferred to the electronic device 1202, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the electronic device 1202 and the application server 1208, can be handled by the web server 1206. It should be understood that the web server 1206 and application server 1208 are not required and are merely example components, as structured code discussed herein can be executed on any appropriate device or host machine as discussed elsewhere herein.

The data store 1210 can include several separate data tables, databases, or other data storage mechanisms and media for storing data relating to a particular aspect. For example, the data store illustrated includes mechanisms for storing production data 1212 and user information 1216, which can be used to serve content for the production side. The data store 1210 also is shown to include a mechanism for storing log or session data 1214. It should be understood that there can be many other aspects that may need to be stored in the data store, such as page image information and access rights information, which can be stored in any of the above listed mechanisms as appropriate or in additional mechanisms in the data store 1210. The data store 1210 is operable, through logic associated therewith, to receive instructions from the application server 1208 and obtain, update, or otherwise process data in response thereto. In one example, a user might submit a search request for a certain type of item. In this case, the data store 1210 might access the user information 1216 to verify the identity of the user and can access a production data 1212 to obtain information about items of that type. The information can then be returned to the user, such as in a listing of results on a web page that the user is able to view via a browser on the electronic device 1202. Information for a particular item of interest can be viewed in a dedicated page or window of the browser.

The web server 1206, application server 1208, and/or data store 1210 may be implemented by one or more electronic devices 1220, which can also be referred to as electronic server devices or server end stations, and may or may not be located in different geographic locations. Each of the one or more electronic devices 1220 may include an operating system that provides executable program instructions for the general administration and operation of that device and typically will include computer-readable medium storing instructions that, when executed by a processor of the device, allow the device to perform its intended functions.

Suitable implementations for the operating system and general functionality of the devices are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the environment 1200 in FIG. 12 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network, a wide-area network, a virtual private network, the Internet, an intranet, an extranet, a public switched telephone network, an infrared network, a wireless network, and any combination thereof.

In embodiments utilizing a web server, the web server can run any of a variety of server or mid-tier applications, including HTTP servers, FTP servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 102A-102N) may be used to indicate that there can be one or multiple instances of the referenced entity in some embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The various methods as illustrated in the Figures and described herein represent exemplary embodiments of methods. The methods may be implemented in software, hardware, or a combination thereof. The order of the methods may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A computer-implemented method comprising:
   generating a first build of a software project from a first one or more source files;
   obtaining a code commit for the software project that changes the software project to yield a second one or more source files that result from an application of the code commit to the first one or more source files;
   generating a second build of the software project from the second one or more source files;
   performing an instruction-level comparison of the first build with the second build to yield an instruction difference;
   generating a change impact, based at least in part on the instruction difference, that indicates behavioral differences between the first build of the software project and the second build of the software project;
   performing a security analysis of one or more parts of the software project at locations identified based on the behavioral differences indicated by the change impact to determine a security risk value for the code commit, wherein the security analysis is performed on less than all of the software project, the security analysis including:
   identifying, based at least in part on a strongly-connected analysis, a plurality of parts of the software project having behavioral impacts due to the code commit;
   performing, by a first compute instance, a first program analysis of a first part of the plurality of parts of the software project; and
   performing, by a second compute instance, a second program analysis of a second part of the plurality of parts of the software project; and
   transmitting, to an electronic device, the security risk value for the code commit.

2. The computer-implemented method of claim 1, further comprising:
   generating a syntactic difference that reflects line-by-line differences between the first one or more source files and the second one or more source files that result from the application of the code commit to the first one or more source files;
   generating a semantic difference by annotating the syntactic difference with indicators of control or data dependencies introduced by changes of the code commit detected based on an analysis of the instruction difference; and
   transmitting, to the electronic device, the semantic difference.

3. The computer-implemented method of claim 1, further comprising:
   performing a plurality of security analyses of parts of a plurality of software projects at locations identified based on behavioral differences indicated by a plurality change impacts to yield a plurality of security risk values; and
   transmitting, to the electronic device, the plurality of security risk values.

4. A computer-implemented method comprising:
   performing an instruction-level comparison between a first build of a software project and a second build of the software project to yield an instruction difference, wherein the first build was generated using a first one or more source files and the second build was generated using a second one or more source files that resulted from a code commit being applied to the first one or more source files;
   generating a change impact, based at least in part on the instruction difference, that indicates behavioral differences between the first build of the software project and the second build of the software project;
   performing a security analysis of one or more parts of the software project identified based at least in part on the behavioral differences indicated by the change impact to determine a security risk value for the code commit, the security analysis including:
   identifying, based at least in part on a strongly-connected analysis, a plurality of parts of the software project having behavioral impacts due to the code commit;
   performing, by a first compute instance, a first program analysis of a first part of the plurality of parts of the software project; and
   performing, by a second compute instance, a second program analysis of a second part of the plurality of parts of the software project; and
   transmitting, to an electronic device, the security risk value for the code commit.

5. The computer-implemented method of claim 4, further comprising:

generating a syntactic difference that reflects line-by-line differences between the first one or more source files and the second one or more source files that result from an application of the code commit to the first one or more source files;

generating a semantic difference by annotating the syntactic difference with one or more indicators of control or data dependencies introduced by changes of the code commit detected based on an analysis of the instruction difference; and transmitting, to the electronic device, the semantic difference.

6. The computer-implemented method of claim 4, further comprising:

performing a plurality of security analyses for a plurality of software projects at parts of the plurality of software projects identified based at least in part on behavior differences indicated by a plurality of semantic differences to yield a plurality of security risk values; and transmitting, to the electronic device, the plurality of security risk values.

7. The computer-implemented method of claim 6, further comprising:

transmitting, to the electronic device, a security description corresponding to at least one of the plurality of security risk values that identifies a security condition detected to result from a corresponding code commit, wherein the security condition was identified as a result of the security analysis of the corresponding software project.

8. The computer-implemented method of claim 4, wherein the first compute instance and the second compute instance are executed by separate electronic devices.

9. The computer-implemented method of claim 4, wherein the first program analysis and the second program analysis each comprise computing invariants that describe traces of the software project.

10. The computer-implemented method of claim 9, further comprising:

receiving, via an application programming interface (API), a request to subscribe to security update information related to the software project.

11. The computer-implemented method of claim 4, wherein the security analysis checks for an existence of one or more of:

a memory corruption;
an uncaught exception;
an incorrect usage of a security-related application programming interface (API); or
a logic bomb.

12. A non-transitory computer-readable storage medium storing instructions which, when executed by one or more processors of one or more computing devices, cause the one or more computing devices to:

generate an instruction difference between a first build of a software project and a second build of the software project, wherein the second build was generated after a code commit was applied to the software project and the first build was generated before the code commit was applied to the software project;

generate a change impact, based at least in part on the instruction difference, that indicates behavioral differences between the first build and the second build;

perform a security analysis of one or more parts of the software project identified based at least in part on the behavioral differences indicated by the change impact to determine a security risk value for the code commit, the security analysis including:

performing a strongly-coupled component analysis to identify a plurality of weakly connected parts of the software project having behavioral impacts resulting from the code commit;

performing, by a first compute instance, a first program analysis of a first part of the plurality of weakly connected parts of the software project; and performing, by a second compute instance, a second program analysis of a second part of the plurality of weakly connected parts of the software project, wherein the second program analysis is performed at least partially in parallel with the first program analysis; and transmit, to an electronic device, the security risk value for the code commit.

13. The non-transitory computer-readable storage medium of claim 12, wherein the instructions further cause the one or more computing devices to:

generate a syntactic difference that reflects line-by-line differences between source files of the software project before and after the application of the code commit;

generate a semantic difference by annotating the syntactic difference with one or more indicators of control or data dependencies introduced by changes of the code commit detected based on an analysis of the instruction difference; and transmit, to the electronic device, the semantic difference.

14. The non-transitory computer-readable storage medium of claim 12, wherein the instructions further cause the one or more computing devices to:

perform a plurality of security analyses for a plurality of software projects at parts of the plurality of software projects identified based at least in part on behavior differences indicated by a plurality of semantic differences to yield a plurality of security risk values; and transmit, to the electronic device, the plurality of security risk values.

15. The non-transitory computer-readable storage medium of claim 14, wherein the instructions further cause the one or more computing devices to:

transmit, to the electronic device, a security description corresponding to at least one of the plurality of security risk values that identifies a security condition detected to result from a corresponding code commit, wherein the security condition was identified as a result of the security analysis of the corresponding software project.

16. The non-transitory computer-readable storage medium of claim 12, wherein the first compute instance and the second compute instance are executed by separate computing devices.

17. The non-transitory computer-readable storage medium of claim 12, wherein the first program analysis and the second program analysis each comprise computing invariants that describe traces of the software project.

18. The non-transitory computer-readable storage medium of claim 12, wherein the security analysis checks for an existence of one or more of:

a memory corruption;
an uncaught exception;
an incorrect usage of a security-related application programming interface (API); or
a logic bomb.

* * * * *